US008520654B2

(12) United States Patent
Heo et al.

(10) Patent No.: US 8,520,654 B2
(45) Date of Patent: Aug. 27, 2013

(54) METHOD AND APPARATUS FOR ALLOCATING AND IDENTIFYING FREQUENCY RESOURCES IN A FREQUENCY DIVISION MULTIPLE ACCESS SYSTEM

(75) Inventors: Youn-Hyoung Heo, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1433 days.

(21) Appl. No.: 11/725,974

(22) Filed: Mar. 20, 2007

(65) Prior Publication Data

US 2007/0230350 A1  Oct. 4, 2007

(30) Foreign Application Priority Data

Mar. 20, 2006  (KR) ......................... 10-2006-0025479

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl.
USPC ........... 370/344; 370/235; 370/252; 370/329; 455/525

(58) Field of Classification Search
USPC .......... 370/344–395, 235–342; 455/436–522
See application file for complete search history.

(56) References Cited

U.S. PATENT DOCUMENTS

| 6,980,540 | B1 | 12/2005 | Laroia et al. |
| 7,480,269 | B2* | 1/2009 | Heo et al. ..................... 370/328 |
| 7,646,746 | B2* | 1/2010 | Jiang ............................. 370/328 |
| 7,693,156 | B2* | 4/2010 | Liljestrom et al. ......... 370/395.4 |
| 7,801,549 | B2* | 9/2010 | Bucknell et al. .............. 455/522 |
| 8,125,947 | B2* | 2/2012 | Bachl et al. .................... 370/329 |
| 2001/0030956 | A1 | 10/2001 | Chillariga et al. |
| 2001/0046879 | A1* | 11/2001 | Schramm et al. ............. 455/525 |
| 2003/0013451 | A1 | 1/2003 | Walton |
| 2003/0123425 | A1 | 7/2003 | Walton et al. |
| 2005/0025100 | A1* | 2/2005 | Lee et al. ...................... 370/335 |
| 2005/0141454 | A1* | 6/2005 | Jain et al. ...................... 370/331 |
| 2005/0254519 | A1 | 11/2005 | Beukema et al. |

(Continued)

FOREIGN PATENT DOCUMENTS

KR  1020010015251  2/2001
KR  1020060054664  5/2006

OTHER PUBLICATIONS

Mobile WIMAX—Part II—"A Competitive Analysis", Prepared on Behalf of the Wimax Forum, Feb. 22, 2006.

*Primary Examiner* — Man Phan
(74) *Attorney, Agent, or Firm* — The Farrell Law Firm, P.C.

(57) ABSTRACT

A method is provided for allocating and identifying frequency resources to a terminal in a Frequency Division Multiple Access (FDMA) system. The method includes receiving from a base station a scheduling message including frequency resource information; and calculating the allocated frequency resource based on relative information if the scheduling message is a Relative Grant (RG) message including the relative information generated on a basis of a currently used channel. The relative information includes one of an identifier of a terminal, or an identifier of a channel in use by the terminal as a terminal ID, state information indicating number of channel that stands for increase or decrease amount of frequency resources on a basis of the currently used channel, and, direction information indicating a direction of the state information.

19 Claims, 14 Drawing Sheets

(56) References Cited

U.S. PATENT DOCUMENTS

| | | | |
|---|---|---|---|
| 2006/0062146 A1* | 3/2006 | Sebire et al. | 370/230 |
| 2006/0159013 A1* | 7/2006 | Lee et al. | 370/229 |
| 2006/0215560 A1* | 9/2006 | Sebire et al. | 370/235 |
| 2006/0215604 A1* | 9/2006 | Mueckenheim et al. | 370/329 |
| 2007/0286146 A1* | 12/2007 | Kuroda et al. | 370/342 |
| 2008/0070583 A1* | 3/2008 | Tseng et al. | 455/450 |
| 2008/0214123 A1* | 9/2008 | Usuda et al. | 455/68 |
| 2008/0253300 A1* | 10/2008 | Wakabayashi et al. | 370/252 |
| 2009/0124257 A1* | 5/2009 | Karlsson et al. | 455/435.1 |
| 2009/0141675 A1* | 6/2009 | Sebire et al. | 370/329 |
| 2012/0257591 A1* | 10/2012 | Terry et al. | 370/329 |

* cited by examiner

METHOD AND APPARATUS FOR ALLOCATING AND IDENTIFYING FREQUENCY RESOURCES IN A FREQUENCY DIVISION MULTIPLE ACCESS SYSTEM

PRIORITY

This application claims priority under 35 U.S.C. §119(a) to a Korean Patent Application filed in the Korean Intellectual Property Office on Mar. 20, 2006 entitled "Method and Apparatus for Allocating Frequency Resources in a Frequency Division Multiple Access System" and assigned Serial No. 2006-25479, the disclosure of which is incorporated herein by reference.

BACKGROUND OF THE INVENTION

1. Field of the Invention

The present invention relates generally to a method and apparatus for allocating and identifying frequency resources in a Frequency Division Multiple Access (FDMA) system, and in particular, to a method and apparatus for allocating frequency resources of an uplink channel in an Orthogonal Frequency Division Multiple Access (OFDMA) or Single Carrier Frequency Division Multiple Access (SC-FDMA) system.

2. Description of the Related Art

Uplink multiple access schemes recently used in mobile communication systems can be roughly classified into non-orthogonal multiple access scheme and orthogonal multiple access scheme. The non-orthogonal multiple access scheme refers to a multiple access scheme in which uplink signals transmitted from multiple terminals are not orthogonal to each other. Code Division Multiple Access (CDMA) can be a typical non-orthogonal multiple access scheme. The orthogonal multiple access scheme refers to a multiple access scheme in which uplink signals from multiple terminals are orthogonal to each other. FDMA and Time Division Multiple Access (TDMA) can be typical orthogonal multiple access schemes.

In the general mobile packet data communication system, a combined multiple access scheme of FDMA and TDMA is used as an orthogonal multiple access scheme. That is, transmissions of multiple users can be distinguished in the frequency and time domains. In the following description, FDMA refers to a combined multiple access scheme of FDMA and TDMA.

OFDMA and SC-FDMA can be typical FDMA. These FDMA schemes refer to a multiple access scheme in which multiple terminals transmit signals using different sub-carriers so that the terminal signals are distinguishable from each other.

OFDM, a scheme for transmitting data using multiple carriers, is a kind of Multi-Carrier Modulation (MCM) that converts a serial input symbol stream into parallel symbol streams and modulates them with multiple orthogonal sub-carriers, i.e. multiple sub-carrier channels.

FIG. 1 is a block diagram of a general OFDM system transmitter's structure. Referring to FIG. 1, an OFDM transmitter 100 includes an encoder 101, a modulator 102, a serial-to-parallel (S/P) converter 103, an Inverse Fast Fourier Transform (IFFT) processor 104, a parallel-to-serial (P/S) converter 105, and a Cyclic Prefix (CP) inserter 106.

Encoder 101, called a channel encoding block, performs channel coding on an input information bit stream. Generally, encoder 101 can be classified into convolutional encoder, turbo encoder, and Low Density Parity Check (LDPC) encoder, and the like. Modulator 102 performs such modulation as Quadrature Phase Shift Keying (QPSK), 8-ary PSK (8 PSK), 16-ary Quadrature Amplitude Modulation (16 QAM), 64 QAM, 256 QAM, etc. Although not shown in FIG. 1, a rate matching block for performing repetition and puncturing can be added between encoder 101 and modulator 102.

S/P converter 103 serves to convert the output of modulator 102 into a parallel signal. IFFT block 104 performs IFFT calculation on the output of S/P converter 103. The output of IFFT block 104 is converted into a serial signal by P/S converter 105. CP inserter 106 inserts a Cyclic Prefix (CP) into an output signal of P/S converter 105.

IFFT processor 104 transforms frequency-domain input data, into time-domain output data. In the general OFDM system where input data is processed in the frequency domain, if the input data is transformed into time-domain data by IFFT processor 104, the Peak-to-Average Power Ratio (PAPR) increases undesirably. The PAPR can be one of the most important factors that should be considered in uplink transmission. If the PAPR increases, cell coverage decreases, causing an increase in the terminal price. Therefore, in the uplink, there is a need for an attempt to reduce the PAPR. Thus, in OFDM-based uplink transmission, use of an uplink multiple access method modified from the general OFDM scheme can be considered. That is, PAPR can be efficiently reduced with the use of a method of processing (channel coding and modulation) the data in the time domain rather than performing the data processing in the frequency domain.

FIG. 2 is a block diagram of a general SC-FDMA system transmitter. Referring to FIG. 2, an SC-FDMA transmitter 200 includes an encoder 201, a modulator 202, an S/P converter 203, an FFT processor 204, a mapper 205, an IFFT block 206, a P/S converter 207, and a CP inserter 208.

Encoder 201 performs channel coding on an input information bit stream. Modulator 202 performs such modulation as QPSK, 8 PSK, 16 QAM, 64 QAM, 256 QAM, etc. A rate matching block is omitted between encoder 201 and modulator 202. S/P converter 203 serves to convert the output of modulator 202 into a parallel signal. FFT block 204 performs FFT calculation on the output of S/P converter 203.

Mapper 205 maps the output of FFT block 204 to an input of IFFT block 206. IFFT block 206 performs IFFT calculation. The output of IFFT block 206 is converted into a serial signal by P/S converter 207. CP inserter 208 inserts a CP into the output signal of P/S converter 207.

The operation of mapper 205 will now be described in detail with reference to FIG. 3. FIG. 3 illustrates the detailed operation of mapper 205 in FIG. 2.

Referring to FIG. 3, channel-coded/modulated data symbols 301 are input to an FFT block 302, and the output of FFT block 302 is input again to IFFT block 304. Here, mapper 303 serves to map output information of FFT block 302 to input information of IFFT block 304. Mapper 303 maps the frequency-domain signals, which were transformed from the time-domain signals by FFT block 302, to appropriate input points of IFFT block 304 so that they can be carried on appropriate sub-carriers. If the output of FFT block 302 is continuously mapped to the input of IFFT block 304 in the mapping process, consecutive sub-carriers are used in the frequency domain. This multiple access scheme is called Localized Frequency Division Multiple Access (LFDMA).

If mapper 303 maps the output of FFT block 302 to the input of IFFT block 304 while maintaining an equal distance (or regular interval), regular-interval sub-carriers are used in the frequency domain. This multiple access scheme is called Interleaved Frequency Division Multiple Access (IFDMA) or Distributed Frequency Division Multiple Access (DFDMA).

In the following description, this multiple access scheme will be referred to as DFDMA, for convenience. FIGS. 2 and 3 show one method of implementing the SC-FDMA technology through frequency axis processing, and several other methods, such as a method of implementing the SC-FDMA technology through time axis processing, can be used.

FIGS. 4A and 4B illustrate positions of DFDMA sub-carriers and LFDMA sub-carriers in the frequency domain, respectively. In a terminal using DFDMA shown in FIG. 4A, sub-carriers are located at regular intervals over the entire frequency domain, and in a terminal using LFDMA shown in FIG. 4B, sub-carriers are consecutively located in a partial frequency domain.

LFDMA and DFDMA have their own unique characteristics. LFDMA, as it uses a partial segment of the entire system frequency band, makes efficient use of frequency scheduling that can select and transmit a partial frequency band having a good channel gain in a frequency selective channel that suffers considerable channel variation in the frequency band. However, DFDMA, as it uses multiple sub-carriers distributed over the broad band, uses frequency diversity gain because it can experience several channel gains together. As described above, in order to maintain the SC-FDMA properties, after passing through only one FFT, the simultaneously transmitted information components should always be mapped to an IFFT block such that they satisfy LFDMA or DFDMA.

In a system using OFDMA or SC-FDMA, when several terminals in one cell have data to transmit over an uplink, the base station needs to allocate frequency resources to the several terminals through scheduling. The scheme of allocating the entire frequency resources to several terminals can be classified into a Localized scheme and a Distributed scheme. When OFDMA uses a Frequency Selective Scheduling scheme or when SC-FDMA uses an LFDMA transmission scheme, the Localized scheme can be used. Otherwise, the base station can allocate frequency resources with the Distributed scheme.

FIG. 5A shows an example of a Localized resource allocation scheme. In FIG. 5A where only the frequency resources used for data transmission are shown, when data is actually transmitted in a physical layer, pilots necessary for the transmission or channels for control information are allocated to other frequency resources and then multiplexed with data channels. The entire frequency band is divided into multiple resource units, and the resource unit is composed of several sub-carriers. The size of the resource unit is determined taking into account overhead of control information during scheduling, gain of scheduling, and a minimum unit of desired transmission data.

In the case shown in FIG. 5A, one resource unit is allocated to a first User Equipment 501 (UE1; or terminal), 3 resource units are allocated to a UE2 503, and 7 resource units are allocated to a UE3 505. In order to inform a corresponding terminal which sub-carrier is allocated thereto, the Localized allocation scheme can simply assign a sequence number to each resource unit and then provide the corresponding number information as channel ID information.

FIG. 5B shows an example of a Distributed resource allocation scheme, which is a DFDMA frequency allocation scheme. Referring to FIG. 5B, a terminal is allocated frequency resources at regular intervals according to the DFDMA characteristics. A UE1 511 is allocated every $12^{th}$ sub-carrier in the entire frequency resources, and a UE2 513 is allocated every $3^{rd}$ sub-carrier. In the example where the total number of sub-carriers is 48, UE1 511 is allocated 4 sub-carriers, and UE2 513 is allocated 16 sub-carriers. As a result, the number of sub-carriers available for UE2 513 is 4 times the number of sub-carriers available for UE1 511.

In DFDMA, the regular interval at which sub-carriers are allocated is called Repetition Factor (RF). To acquire information indicating which sub-carrier is allocated to the corresponding terminal, the Distributed allocation scheme can simply acquire the RF and offset information. In other words, RF=12 and Offset=0 for UE1 511, and RF=3 and Offset=1 for UE2 513.

When a base station allocates frequency resources to terminals with the localized scheme, the scheduling information can include Cell Radio Network Temporary Identifier (C-RNTI), Channel ID, and Modulation and Coding Scheme (MCS) information. C-RNTI enables a connected terminal to determine whether an allocated unique terminal ID is assigned to the corresponding terminal. The Channel ID is information used for indicating which frequency resource is allocated to the terminal. The Channel ID indicates information on the resource units in the Localized scheme, and means a combination of RF and Offset in the Distributed scheme.

In order to efficiently schedule frequency resources, the base station needs to schedule the frequency resources taking into account the channel condition or buffer status of terminals every Transmit Time Interval (TTI), which is the minimum transmission unit of data. However, if the C-RNTI information, the Channel ID information, and the MCS information are transmitted to the corresponding terminals every TTI, signaling overhead of the downlink may increase undesirably. Particularly, in Long Term Evolution (LTE), because TTI is very short, i.e. about 0.5 ms, the signaling overhead problem can be more serious.

Therefore, as an alternative to the above method, there are many proposed methods of transmitting scheduling information in order to reduce the signaling overhead. One of them is a scheduling scheme in which for a real-time service like Voice over Internet Protocol (VoIP), once resources are allocated, a terminal occupies the corresponding resources continuously or for a predetermined time until it receives signaling for release. However, in this scheduling scheme, the terminal continuously occupies the allocated resources. Meanwhile, if a cell has surplus resources or runs short of resources, the cell would then need to reduce or add some resources. For this, there is a need for additional signaling information.

In the IEEE 802.20 system, when there is a change in resource allocation, the base station transmits resource allocation information using supplemental bits. This method uses the entire information even when frequency resources are additionally reduced/increased or the completely new frequency resources are allocated, thereby causing an increase in the overhead.

SUMMARY OF THE INVENTION

An aspect of the present invention is to address at least the above described problems and/or disadvantages and to provide at least the advantages described below. Accordingly, an aspect of the present invention is to provide a method and apparatus for efficiently allocating and identifying frequency resources in an FDMA system.

Another aspect of the present invention is to provide a frequency resource allocation method and apparatus capable of reducing signaling overhead in an FDMA system.

According to one aspect of the present invention, there is provided a method for identifying frequency resources allocation to a terminal in a Frequency Division Multiple Access (FDMA) system. The method includes receiving from a base station a scheduling message including frequency resource information; and calculating the allocated frequency resource based on relative information if the scheduling message is a Relative Grant (RG) message including the relative information generated on a basis of a currently used channel.

Preferably, the relative information includes one of an identifier of a terminal, or an identifier of a channel in use by the terminal as a terminal ID; state information indicating number of channel that stands for increase or decrease amount of frequency resources on a basis of the currently used channel; and direction information indicating a direction of the state information.

According to another aspect of the present invention, there is provided an apparatus for identifying frequency resources allocation to a terminal in a Frequency Division Multiple Access (FDMA) system. The apparatus includes a receiver for receiving from a base station a scheduling message including frequency resource information; a data transmission controller for calculating the allocated frequency resource based on relative information if the scheduling message is a Relative Grant (RG) message including the relative information generated on a basis of a currently used channel; and a data channel transmitter for transmitting data using the calculated frequency resource.

Preferably, the receiver includes an AG receiver for receiving an Absolute Grant (AG) message including new frequency resource information; and an RG receiver for receiving the RG message including the relative information generated on a basis of the currently used channel.

Preferably, the relative information includes an identifier of a terminal, or an identifier of a channel in use by the terminal; state information indicating 'increase' or 'decrease' of frequency resources on a basis of the currently used channel; and direction information indicating the direction of the increase/decrease information.

According to yet another aspect of the present invention, there is provided a method for allocating frequency resources in a base station of a Frequency Division Multiple Access (FDMA) system. The method includes generating a Relative Grant (RG) message including relative information generated on a basis of a currently used channel, if there is a change in frequency resources allocated to a specific terminal; and transmitting the generated RG message to the terminal.

According to still another aspect of the present invention, there is provided an apparatus for allocating frequency resources in a base station of a Frequency Division Multiple Access (FDMA) system. The apparatus includes a first means for generating a Relative Grant (RG) message including relative information generated on a basis of a currently used channel, if there is a change in frequency resources allocated to a specific terminal; and a second means for transmitting the generated RG message to the terminal.

BRIEF DESCRIPTION OF THE DRAWINGS

The above and other aspect, features and advantages of the present invention will become more apparent from the following detailed description when taken in conjunction with the accompanying drawings in which.

DETAILED DESCRIPTION OF PREFERRED EMBODIMENTS

Figure 1:
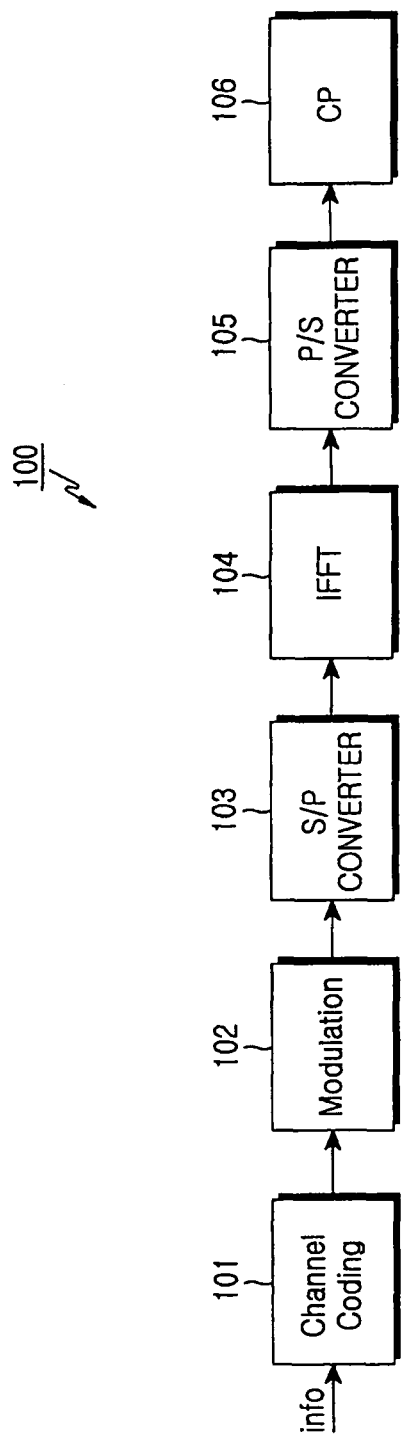
FIG. 1 is a block diagram of a general OFDM system a transmitter structure.
Figure 2:
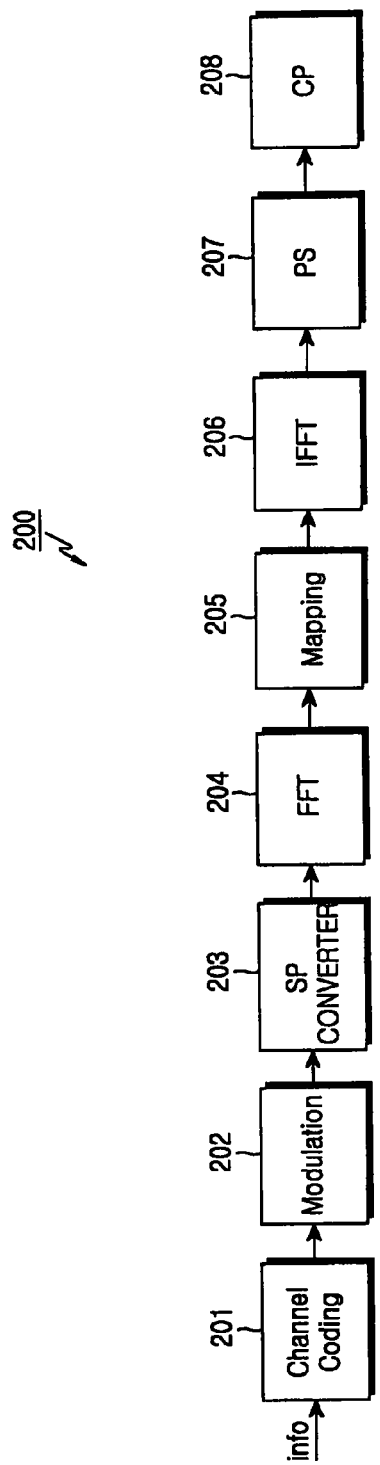
FIG. 2 is a block diagram of a general SC-FDMA system of a transmitter.
Figure 3:
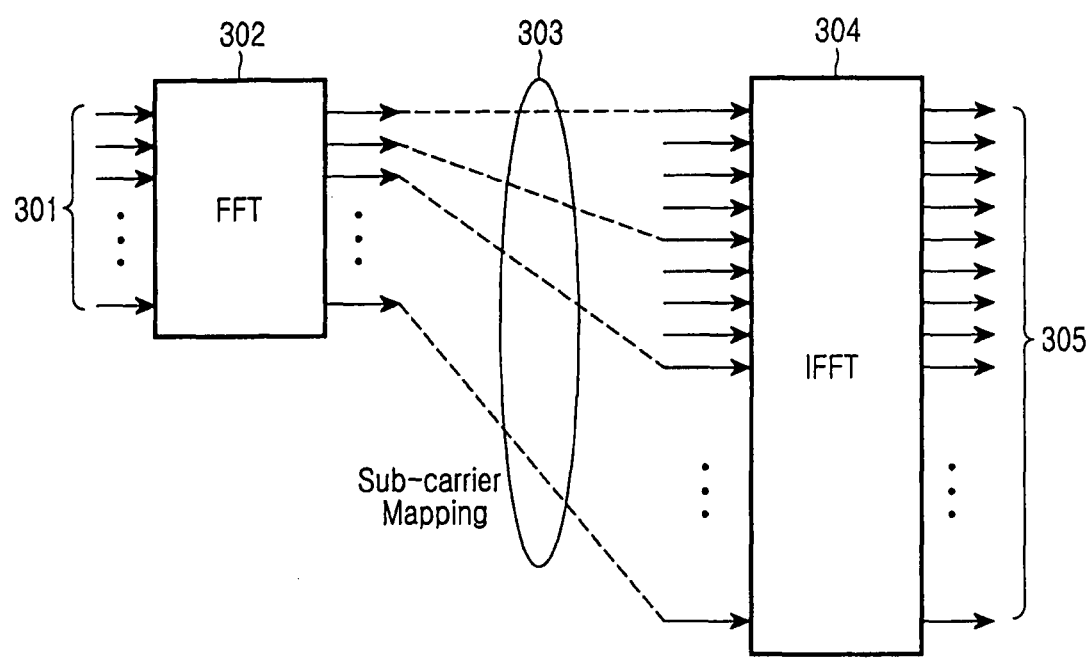
FIG. 3 shows the detailed operation of the mapper shown in FIG. 2.
Figure 4A:
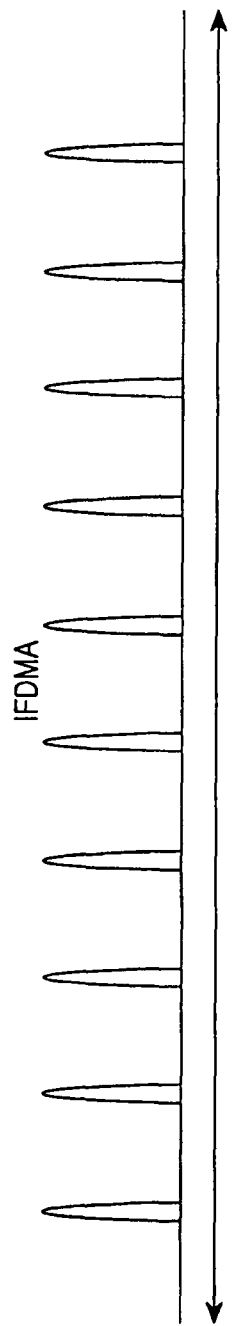
FIGS. 4A and 4B illustrate positions of DFDMA sub-carriers and LFDMA sub-carriers in the frequency domain, respectively.
Figure 4B:
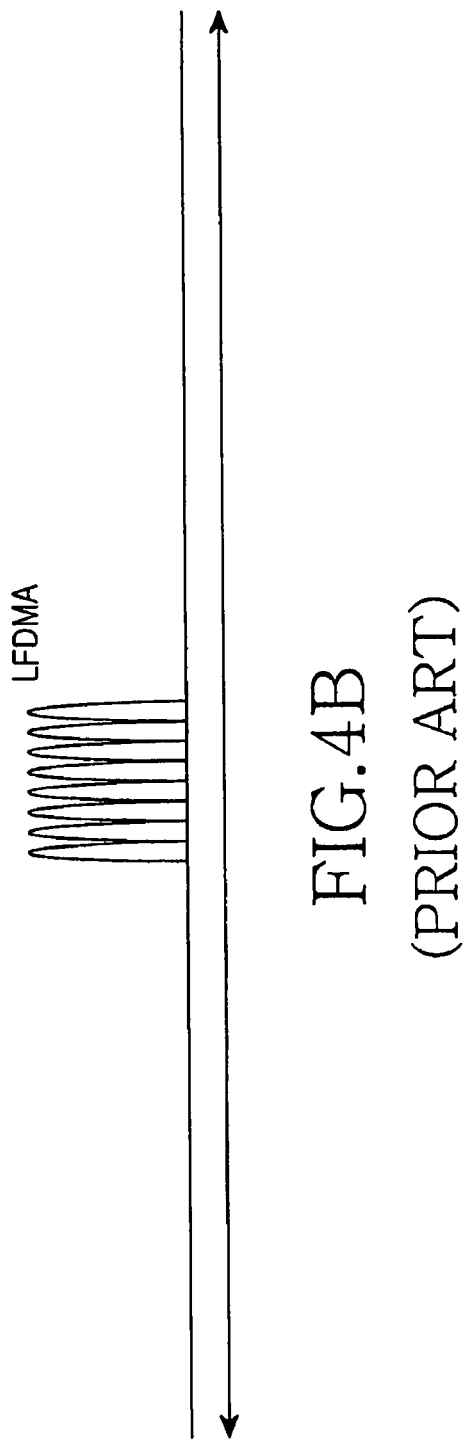
Figure 5A:
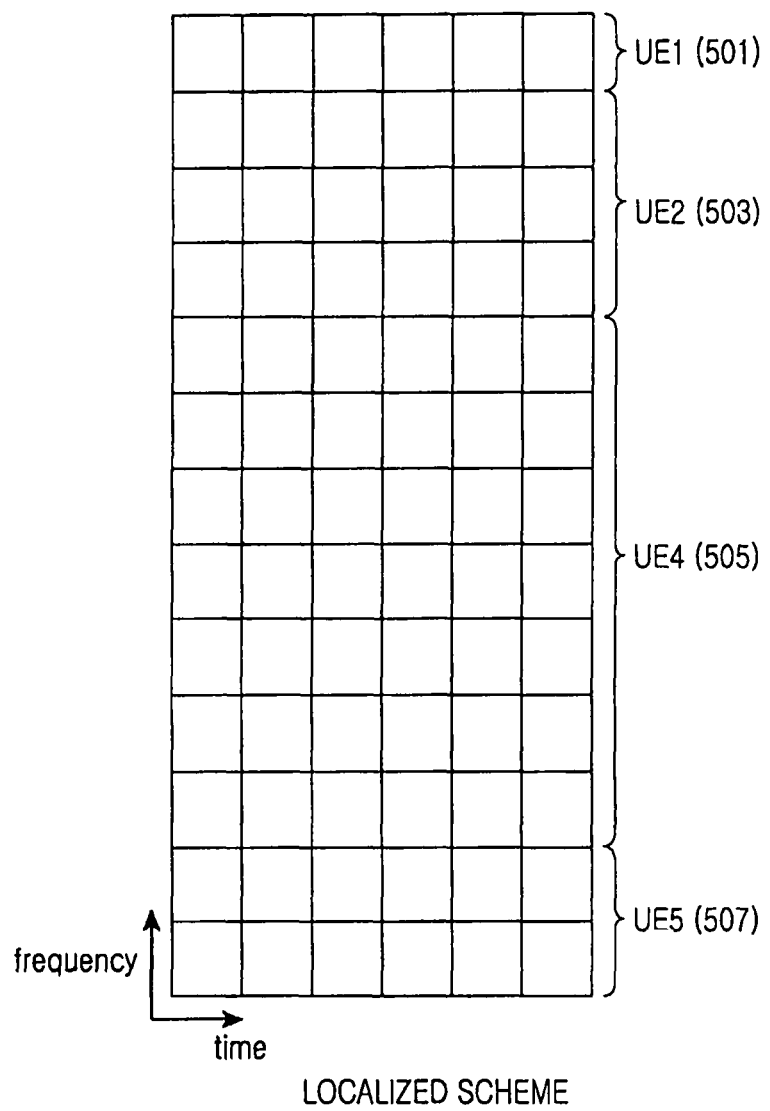
FIGS. 5A and 5B illustrate methods for allocating frequency resources to several terminals in DFDMA and LFDMA, respectively.
Figure 5B:
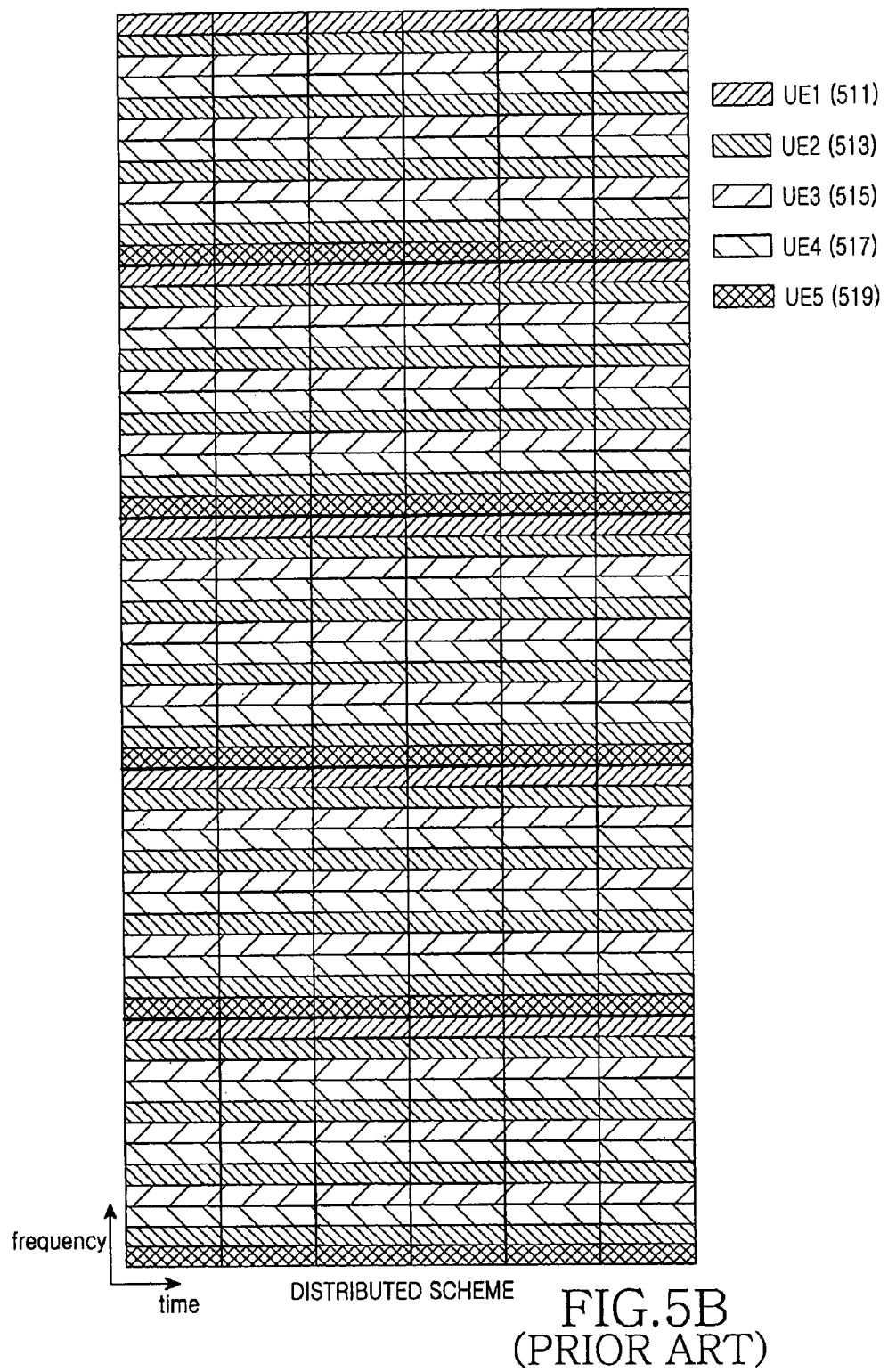

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method capable of reducing signaling overhead by providing information indicating the amount of frequency resource available and indicating which frequency resource among the entire frequency resources is to be used, in an FDMA system, such as OFDMA and SC-FDMA systems, in which a base station schedules data transmission of several terminals by allocating frequency resources.

To this end, the present invention provides the position and amount information of frequency resources using relative information on the basis of the previously allocated frequency resources, instead of using the entire information including the terminal ID, Channel ID, and MCS level, only for the case where frequency resources are added or reduced.

The reason why the present invention has no need to use the entire information when the frequency resources are added or reduced is as follows. Because the OFDMA or SC-FDMA system has the characteristics that terminals in one cell are orthogonal with each other, the terminals can use the power available in the allocated frequency band without limitation. However, when the transmission power is limited considering the possible interference to/from neighboring cells, the power available for the terminals can be restricted. In other words, because the scheduling cell does not need to restrict the transmission power for the corresponding terminal considering other terminals that it should schedule, the need for dynamically changing the MCS level every transmission time decreases, and in order to increase the data rate, it is more appropriate to increase or decrease frequency resources.

When resources are further increased in addition to the previously allocated frequency resources, a base station can select and allocate a frequency band having the best channel environment. However, because this operation may cause complexity that the base station should receive a reference signal from a corresponding terminal over the entire band, the base station will probably allocate frequency resources neighboring the previously allocated frequency band. In addition, because SC-FDMA should necessarily always use consecutive sub-carriers by allocating or reducing an adjacent frequency band in order to maintain the single carrier characteristic, the possible bands of the additionally increased/decreased frequency resources are restricted.

Herein, a message for providing scheduling information is refereed to as an Absolute Grant (AG) message, and a message for providing scheduling information using limited information is referred to as a Relative Grant (RG) message. The AG message for providing position and amount information of frequency resources includes the entire scheduling information, and the RG message includes C-RNTI, which is a unique ID of the terminal, state information indicating increase/decrease in frequency resource, and direction information indicating the direction in which the frequency resource increases/decreases. The AG and RG messages are shown in Table 1 and 2, respectively.

TABLE 1

Absolute Grant

| Information | Bits |
|---|---|
| C-RNTI | 16 |
| Channel ID | 5 |
| MCS | 5 |

TABLE 2

Relative Grant

| Information | Bits |
|---|---|
| C-RNTI or Channel ID | 16/5 |
| Increase/Decrease | 1 |
| Direction (Positive or Negative) | 1 |

The number of bits, shown in Table 1 and Table 2, is subject to change according to the actually applied system. When there is a change in frequency resources, the present invention signals a combination of increase/decrease information and direction information of the RG message. Although the increase/decrease information and the direction information both are indicated with 1 bit in Table 2, the state information can increase in the number of bits when there is a need to simultaneously allocate multiple channels rather than one channel for the increase/decrease variation width.

As to C-RNTI, the AG message is mandatory information but the RG message is subject to change due to the structure of a downlink transmission channel. When the RG message is transmitted using a common channel like the AG message, use of all C-RNTIs or a predefined reduced C-RNTI can be possible, and when the RG message is transmitted using a dedicated channel unlike the AG message, the C-RNTI information may not be needed.

As for the RG message, because there are previously allocated frequency resources, a method of using the previously allocated frequency resources as a terminal ID of the scheduling information instead of the C-RNTI is possible. In this method, if an RG message being coincident with the currently used Channel ID is transmitted, a terminal recognizes it as scheduling information transmitted to the corresponding terminal. Generally, because the number of information bits of Channel ID is less than C-RNTI, the use of this method can reduce the signaling overhead.

The method of using the frequency resource information as a terminal ID can be applied even when there is a need to transmit AG information to a terminal having the previously allocated frequency resources. If an AG message includes the same ID as that of the previously allocated and occupied frequency resources is transmitted, the terminal recognizes it as scheduling information transmitted to the corresponding terminal. Because the general AG information is different in format from the AG message using the frequency resource as a terminal ID or the RG message, there is a need to use a flag or a separate physical channel for detecting the difference.

An operating principle of the present invention will now be made with reference to FIG. 6.

Figure 6:
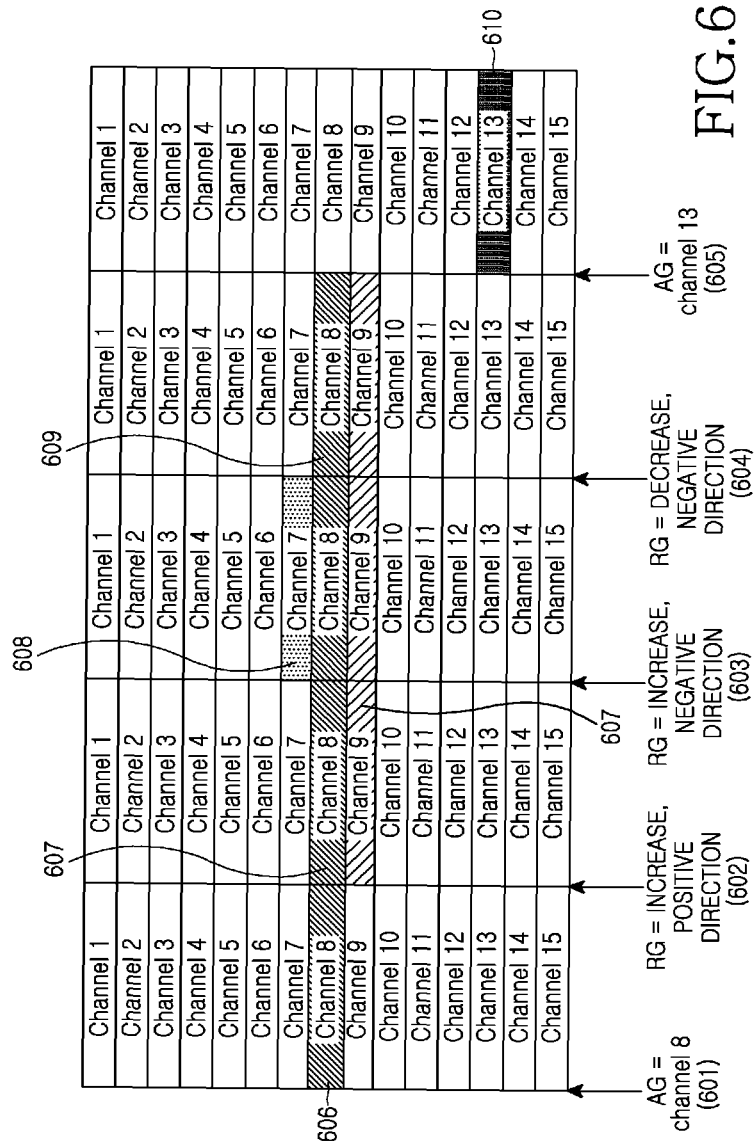
FIG. 6 illustrates a process of allocating channels using scheduling information in a terminal according to the present invention.

Referring to FIG. 6, at time 601, a terminal is allocated information necessary for transmission, through an AG message. If the terminal receives information indicating use of channel #8 through the AG message at time 601, it uses channel #8 in interval 606. If a base station can allocate an additional channel to the corresponding terminal at time 602, it performs signaling using an RG message. At time 602, the base station allocates channel #9. If the RG message transmitted by the base station includes information='increase' and direction information='positive direction', the terminal increases the channel by one step in the positive direction on the basis of the previous channel #8, and performs data transmission using channel #8 and channel #9 in interval 607.

In the next case, the base station intends to additionally allocate a channel and channel #7 is allowable. In order to provide information indicating allocation of channel #7, the base station transmits an RG message with increase/decrease information='increase' and direction information='negative direction' at time 603. Then the terminal recognizes the allocation of channel #7 in addition to the previously allocated channels #8 and #9, and performs data transmission using the 3 channels in interval 608. The use of the RG message is possible even when the base station reduces the previously allocated channels. When the base station does not intend to allocate channel #7, it sends an RG message with increase/decrease information='decrease' and direction information='negative direction' to the terminal at time 604. Then the terminal decreases the channel by one step in the negative direction on the basis of the previous allocated channel #7, channel #8, and channel #9, and performs data transmission using channels #8 and #9 in interval 609. In addition, when the base station intends to allocate a channel inconsecutive to the previous channel to the terminal, it reallocates the channel by re-transmitting an AG message at time 605.

An operation of a terminal according to the present invention will now be described with reference to FIG. 7.

Figure 7:
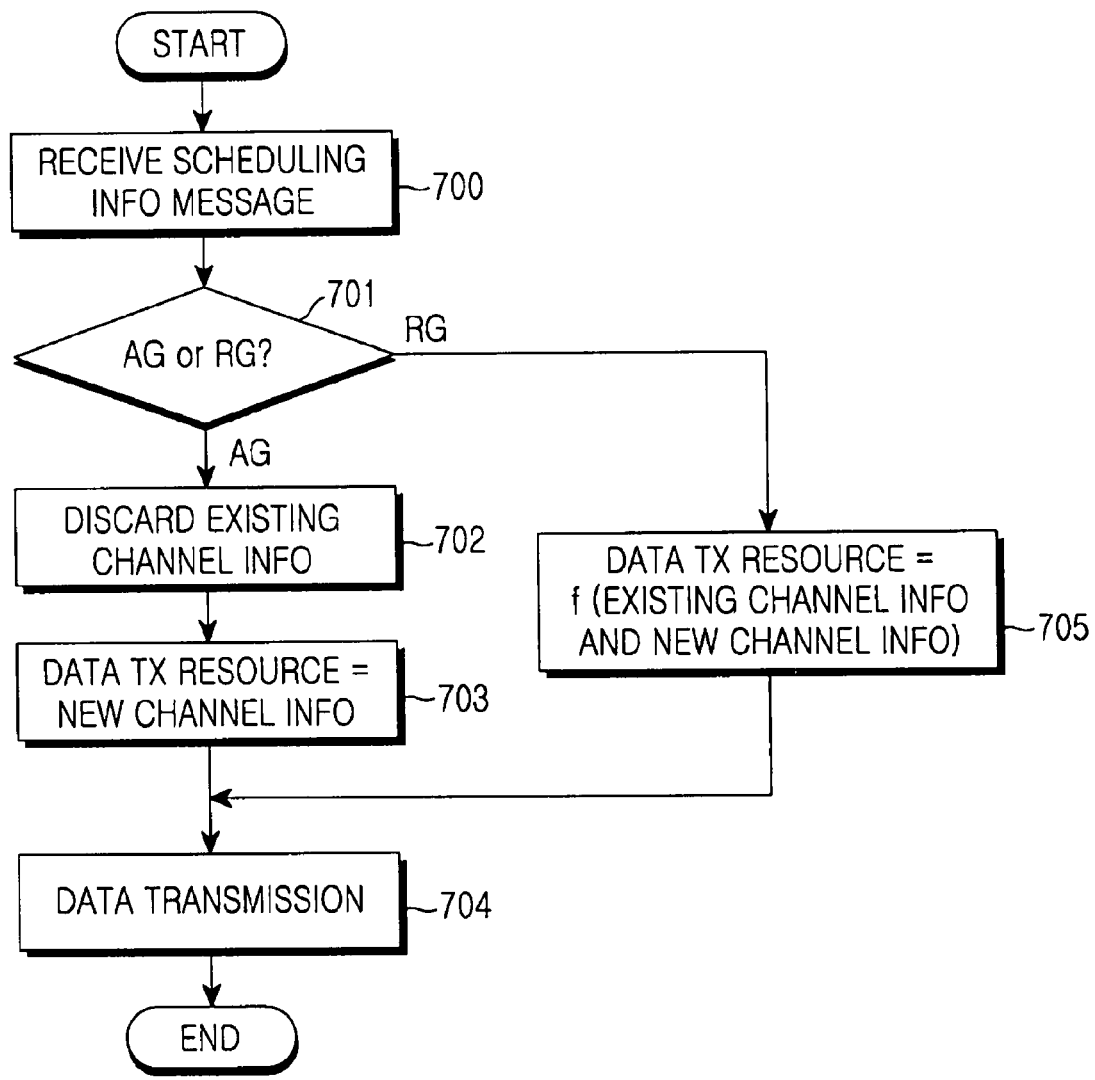
FIG. 7 is the flow chart of a brief operation of a terminal in an FDMA system according to the present invention.

Referring to FIG. 7, a terminal receives scheduling information from a base station in step 700. Thereafter, the terminal determines in step 701 if the received scheduling message is an AG message or an RG message. If the scheduling message is an AG message, the terminal discards the existing channel information in step 702, and sets new channel information as a resource for data transmission in step 703. However, if the scheduling message is an RG message, the terminal proceeds to step 705 where it sets a resource for data transmission as an allocated frequency resource using relative information generated based on the existing channel information. Thereafter, for both cases, the terminal performs data transmission in step 704.

A description will now be made of an example of a frequency resource allocation scheme according to an embodiment of the present invention. Herein, only the parts necessary for understanding of the present invention will be described, and a description of the other parts will be omitted for clarity and conciseness.

A method of processing a scheduling message in a Localized scheme will be described as a first embodiment of the present invention. The Localized scheme, as described above, divides the entire frequency band into resource units each having consecutive sub-carriers, and allocates them taking into account the buffer status and power status of terminals, as shown in FIG. 8.

In the Localized scheme where consecutive frequency resources are used, the terminal can manage frequency resource information with Ch_min and Ch_max considering the use of consecutive frequency resources. When the base station allocates multiple channels to the terminal, the Ch_min means the minimum Channel ID and the Ch_max means the maximum Channel ID. In other words, it means that the terminal transmits data using a frequency band of Ch_min to Ch_max. Although the terminal can manage the frequency resource information consecutively allocated with various methods like a method of setting up a reference channel and setting an offset value, Ch_min and Ch_max will be used herein for convenience.

Figure 8:
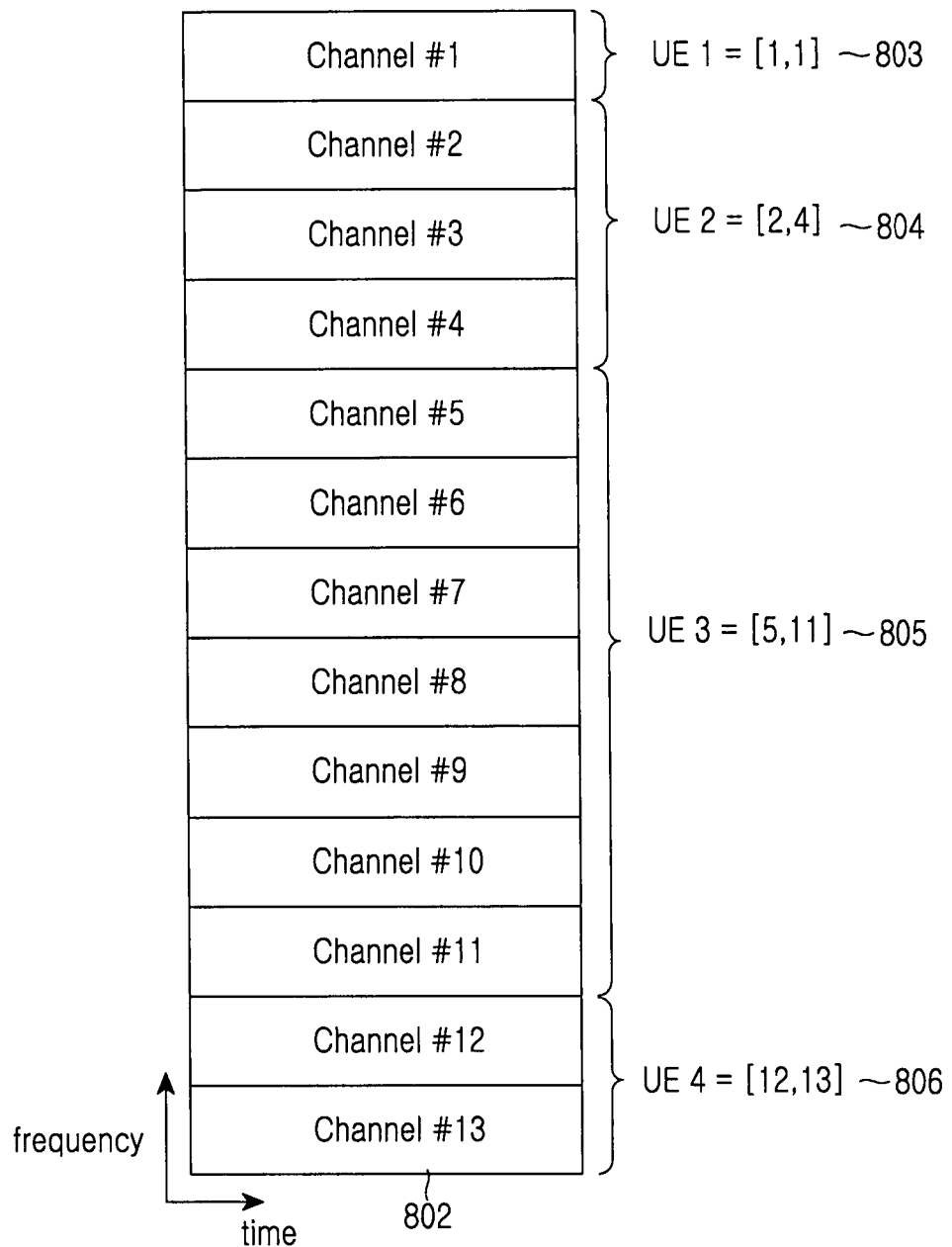
FIG. 8 shows an example of a channel allocation method according to the present invention.

As can be seen in FIG. 8, [Ch_min,Ch_max]=[1,1] is set for a UE1 803 that uses only the channel #1, and [Ch_min, Ch_max]=[2,4] is set for a UE2 804 that uses a channel #2 through a channel #4. The frequency resource information can be set in the same manner even for UE3 805 and UE4 806.

Figure 9:
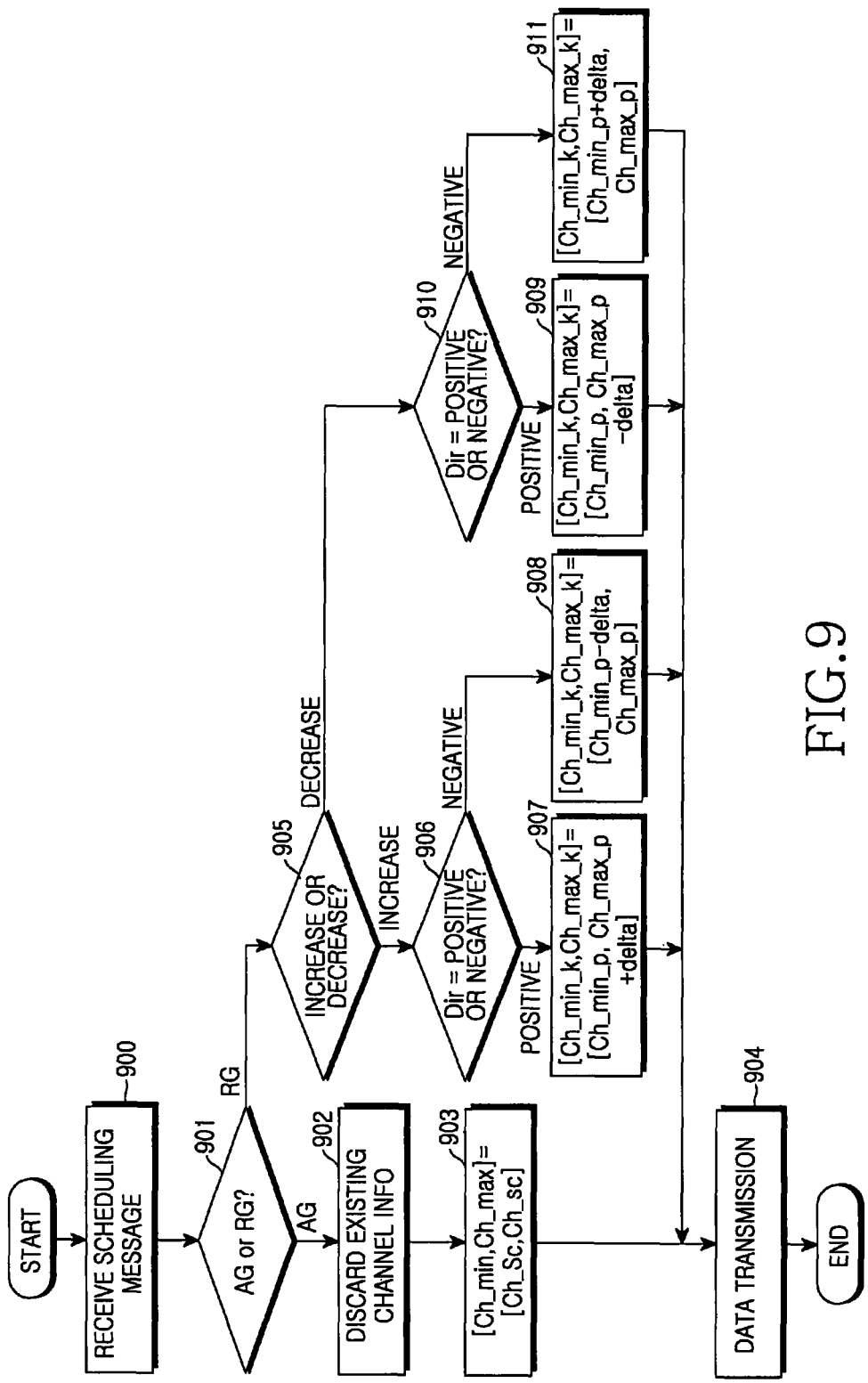
FIG. 9 is a flow chart of a method for allocating frequency resources in a terminal according to the present invention.

Specifically, FIG. 9 is the flow chart of a terminal procedure for applying the proposed AG and RG messages in the Localized allocation scheme.

Referring to FIG. 9, a terminal receives scheduling message including frequency allocation information from a base station in step 900. The terminal determines in step 901 if the received scheduling message is an AG message or an RG message. Herein, the scheduling message can be distinguished by using a flag, or by setting up a separate transmission channel for the AG or RG message.

If the scheduling message is an AG message, the terminal discards the existing channel information if any, in step 902. Thereafter, in step 903, the terminal sets channel information with the transmitted new scheduling information. Because the provided structure receives only one Channel ID using the AG message, both Ch_min and Ch_max are set to channel information (Channel scheduling information (Ch_sc)) allocated through the AG message. If the received scheduling message is an RG message, the terminal checks increase/decrease information in the RG message in step 905. If the increase/decrease information indicates 'increase' meaning that a new channel should be added to the desired existing frequency band, the terminal checks direction information in step 906 in order to determine in which direction the base station intends to increase the channel in the frequency band.

If the direction information indicates a positive direction meaning a channel with a greater Channel ID in the previously allocated frequency band, the terminal re-sets the currently available frequency band in step 907. An expression used for re-setting the frequency band to add an upper channel can be shown as Equation (1).

$$[Ch\_min\_k, Ch\_max\_k] = [Ch\_min\_p, Ch\_max\_p + delta] \quad (1)$$

In Equation (1), Ch_min_k denotes the minimum Channel ID value of a frequency band transmittable at a $k^{th}$ point, and Ch_max_k denotes the maximum Channel ID value of a frequency band transmittable at a $k^{th}$ point. The '$k^{th}$ point' refers to the time at which the terminal receives the scheduling message and applies it. The Ch_min_k has the same value as Ch_min_p, and herein, Ch_min_p is a Ch_min value of the previously allocated frequency band. Next, Ch_max_k is the maximum Channel ID value of a frequency band transmittable at a $k^{th}$ point, and the Ch_max_k is set to a value obtained by adding delta to Ch_max_p. The Ch_max_p is a Ch_max value of the previously allocated frequency band. The delta is a value indicating how many channels the terminal will increase when increasing/decreasing the frequency band. When the increase/decrease information is composed of several bits, the delta information can be directly provided. Otherwise, when only the increase or decrease information is provided, the value can previously be set to an upper layer signaling value.

In additionally increasing the frequency band, if the direction information indicates 'negative', the terminal calculates in step 908 the available frequency band using Equation (2).

$$[Ch\_min\_k, Ch\_max\_k] = [Ch\_min\_p - delta, Ch\_max\_p] \quad (2)$$

If the direction information indicates 'negative direction' meaning a channel with a lower Channel ID value in the currently used frequency band, the entire available frequency band can be increased by delta by subtracting Ch_min_k from the previous Ch_min_p by delta.

Next, even for the case where the RG message indicates 'decrease', the terminal checks direction information in step 910, and if the direction information indicates 'positive direction', the terminal calculates in step 909 available frequency band information using Equation (3).

$$[Ch\_min\_k, Ch\_max\_k] = [Ch\_min\_p, Ch\_max\_p - delta] \quad (3)$$

Next, if the direction information indicates 'negative direction', the terminal subtracts channels with lower Channel ID values using Equation (4).

$$[Ch\_min\_k, Ch\_max\_k] = [Ch\_min\_p + delta, Ch\_max\_p] \quad (4)$$

If channel information available for all cases is set, the terminal transmits data in step 904.

Figure 10:
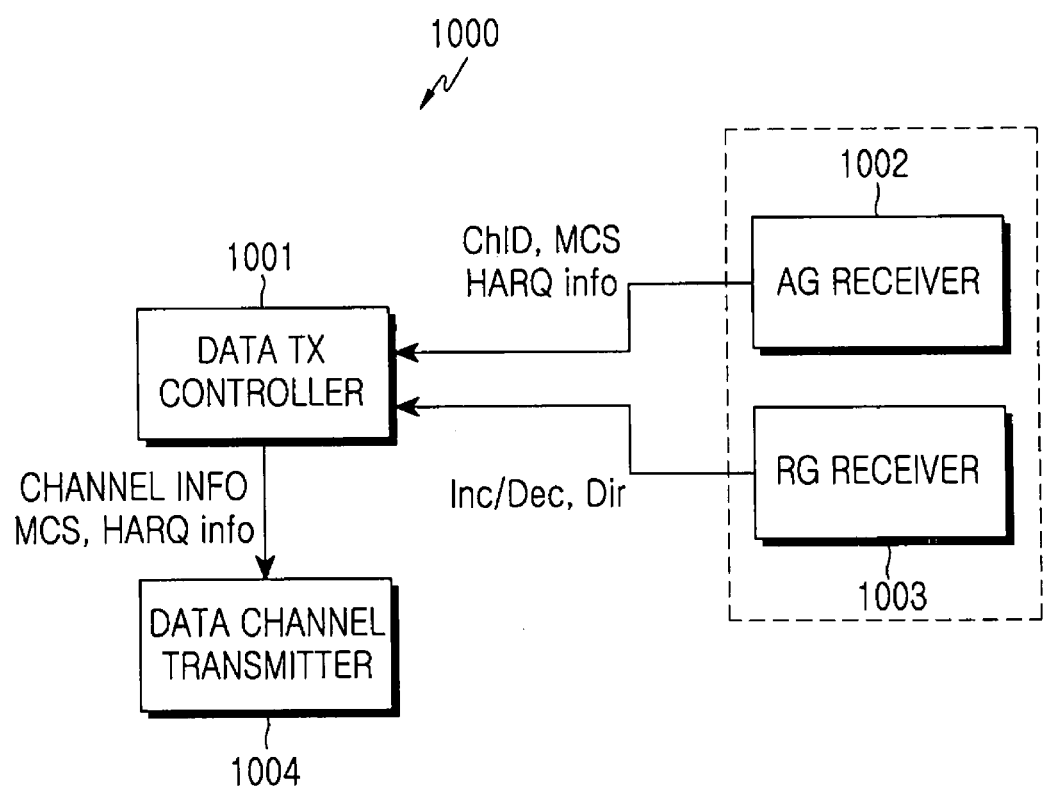
FIG. 10 is a block diagram of a terminal according to the present invention.

Referring to FIG. 10, a terminal 1000 includes an AG receiver 1002 and an RG receiver 1003 for reading corresponding scheduling messages, respectively. AG receiver 1002 and RG receiver 1003 can be implemented in one receiver, or can be separately implemented. In either case, AG receiver 1002 and RG receiver 1003 should operate separately, for the following reason. When an AG message and an RG message are transmitted using different channels, channel reception operations for them are different from each other. In addition, if the messages transmitted over the same channel are distinguished with specific IDs, the channel receivers are equal to each other, but their information bit formats are different from each other. Therefore, the receivers should read the messages using their independent devices.

A data transmission controller 1001 calculates frequency resources available for the corresponding terminal through the procedure described in FIG. 9, depending on the information received from AG receiver 1002 and RG receiver 1003. Data transmission controller 1001 generates information necessary for transmission, and delivers the information to a data channel transmitter 1004. Data channel transmitter 1004 transmits transmission data to the base station.

A method for handling a scheduling message in DFDMA will now be described as a second embodiment of the present invention.

DFDMA, a scheme for allocating spaced sub-carriers to one terminal instead of allocating consecutive sub-carriers in the frequency band, allocates sub-carriers at regular intervals of Repetition Factor (RF) in order to satisfy the single carrier characteristics as described above.

In DFDMA, in order to find available frequency resources, a terminal needs to acquire RF information and Offset information indicating a start sub-carrier. A base station can directly provide the RF and Offset information, or can generate a Channel ID based on the RF and Offset information and provide the Channel ID information. This embodiment will be described based on the former method of directly providing the RF and Offset information.

Figure 11:
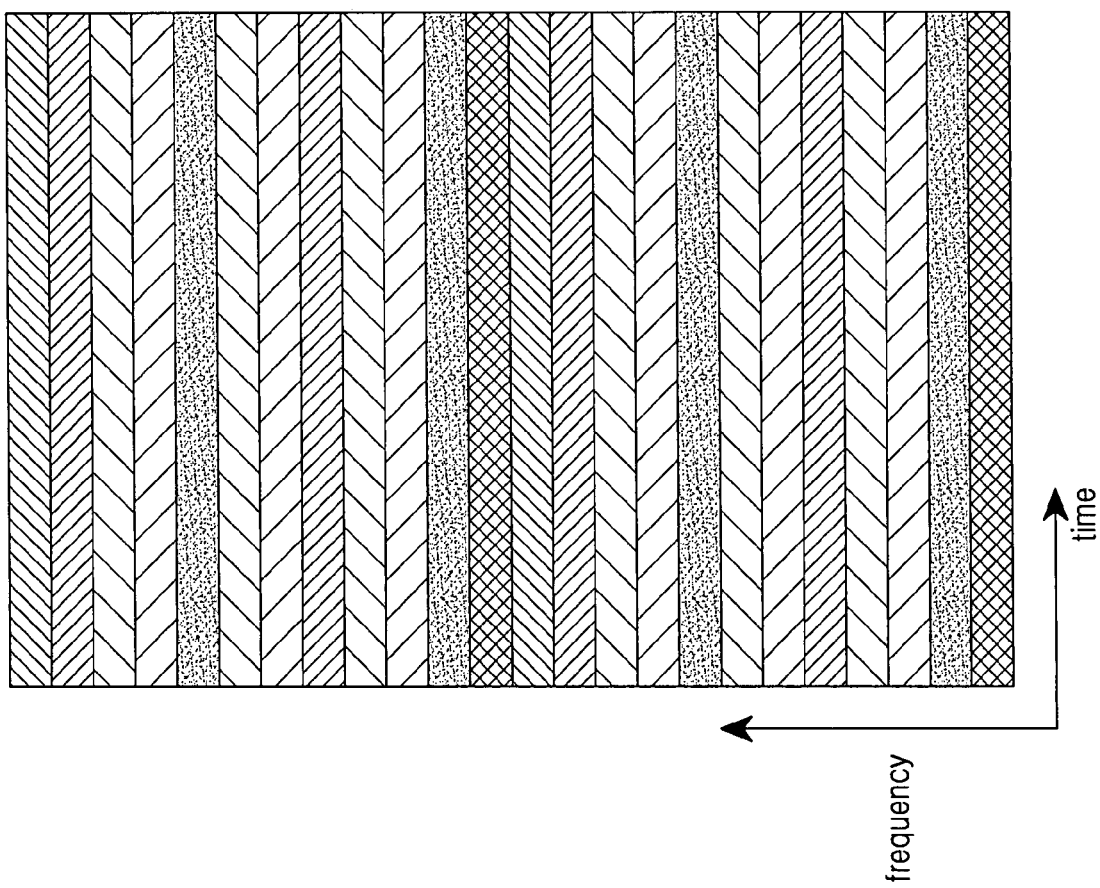
FIG. 11 illustrates exemplary channel management according to the present invention.

As can be seen in FIG. 11, when there are a total of 24 sub-carriers, the greatest RF is 24 (RF=24). One sub-carrier is used for RF=24, and two sub-carriers are used for RF=12. RF indicates the number of available sub-carriers, and Offset indicates a position of the start sub-carrier. Because RF=12 and offset=0 for UE1 1102, the UE1 1102 uses a $1^{st}$ sub-carrier and a $13^{th}$ sub-carrier. Because RF=12 and offset=11 for UE5 1106, UE5 1106 uses a $12^{th}$ sub-carrier and a $24^{th}$ sub-carrier. Although DFDMA can have several methods of increasing/decreasing frequency resources, the simplest method is the method of halving or doubling the RF.

If the RF is halved, the data rate can be increased with the single carrier characteristics being maintained, by simply combining channels having the same RF. In other words, UE2 1103 using RF=6 and Offset=1 should use less RF (RF<6) in order to use more frequency resources. However, because use of RF=5 or RF=4 may affect the entire frequency band, if frequency resources for UE6 1107 with RF=6 and Offset=4 are additionally allocated, RF=3 and Offset=1 are generated, simply facilitating extension of frequency resources.

The frequency resources can be reduced by simply doubling RF. For example, the frequency resources previously allocated with RF=6 and Offset=0 can be reduced to two channels: one channel with RF=12 and Offset=0, and another channel with RF=12 and Offset=6.

Figure 12:
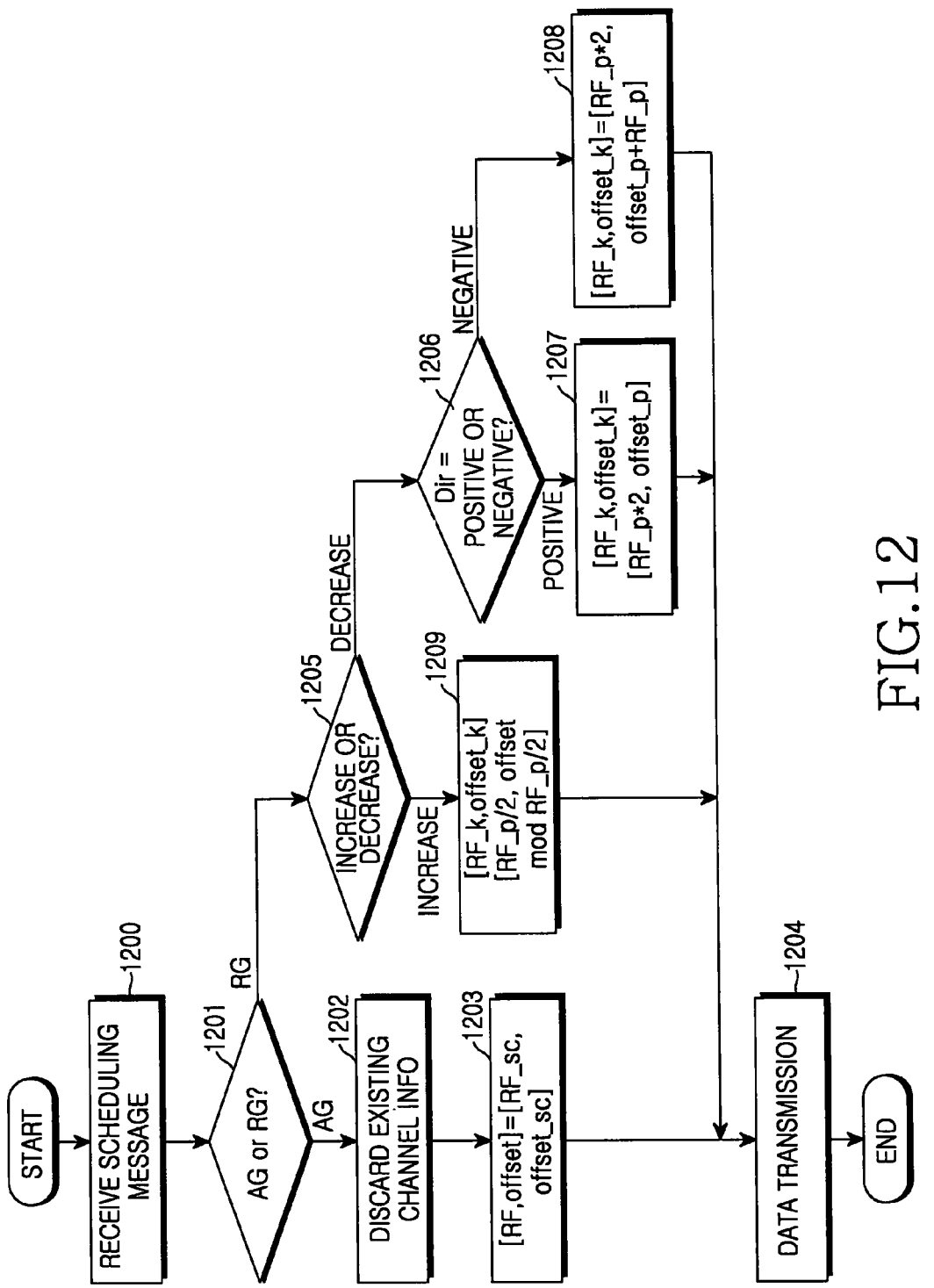
FIG. 12 is a flow chart of a method for allocating frequency resources in a terminal according to the present invention.

FIG. 12 illustrates a terminal operation needed for implementing AG and RG in DFDMA.

Referring to FIG. 12, a terminal receives a scheduling message in step 1200, and determines in step 1201 if the scheduling message including frequency allocation information is an AG message or an RG message. Herein, the scheduling message can be distinguished by using a flag, or by setting up a separate transmission channel for the AG or RG message.

If the received scheduling message is an AG message, the terminal discards the existing channel information in step 1202, and updates available channel information using the new scheduling information in step 1203.

However, if the received scheduling message is an RG message, the terminal reads in step 1205 increase/decrease information from the RG message and determines if the increase/decrease information indicates 'increase' or 'decrease'. If the increase/decrease information indicates 'increase', the terminal sets RF and Offset values using Equation (5) in step 1209.

$$[RF\_k, offset\_k] = [RF\_p/2, (offset\_p) Mod (RF\_p/2)] \quad (5)$$

In Equation (5), RF_k denotes an RF value of frequency resources to be used for the next data transmission, and RF_p denotes a previously allocated RF value. Because the frequency resources can be increased by halving the existing RF_p, RF_k=RF_p/2 and an Offset value is maintained. However, when Offset is greater than RF, an initial Offset value is found with a modular operation. For the 'increase', because RF always has the minimum value, there is no need for direction bits.

However, if the increase/decrease information indicates 'decrease', the terminal checks direction information in step 1206. Herein, the direction information is needed for the following reason. As described above, for the 'decrease', the separation into two channels is possible. In this case, the direction information is used to indicate which of the two channels is to be used. A method of selecting channels using the direction information selects a channel with high Offset if the direction information indicates 'positive', and selects a channel with low Offset if the direction information indicates 'negative'. Therefore, if the direction information indicates 'positive', the terminal re-calculates RF and Offset values using Equation (6) in step 1207, and if the direction information indicates 'negative', the terminal re-calculates RF and Offset values using Equation (7) in step 1208.

$$[RF\_k, offset\_k] = [RF\_p*2, offset\_p] \quad (6)$$

$$[RF\_k, offset\_k] = [RF\_p*2, offset\_p + RF\_p] \quad (7)$$

The terminal apparatus used in the second embodiment is equal in structure to the terminal apparatus used in the first embodiment except for the frequency allocation method performed in the data transmission controller.

As can be understood from the foregoing description, to additionally increase or decrease the previously allocated frequency resources, the terminal transmits relative information on the basis of the previously allocated frequency resource information, thereby contributing to a reduction in signaling overhead of the scheduling information.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. A method for identifying frequency resources allocation in a terminal of a Frequency Division Multiple Access (FDMA) system, the method comprising the steps of:
    (a) receiving, from a base station, a scheduling message including frequency resource information;
    (b) determining channels allocated to the terminal based on relative information, if the scheduling message is a Relative Grant (RG) message including the relative information generated based on a currently used channel; and
    (c) transmitting data using the determined channels,
    wherein the relative information includes state information indicating a number of channels to increase or decrease an amount of the frequency resources based on the currently used channel, and direction information indicating a direction to increase or decrease the amount of the frequency resources based on the currently used channel.

2. The method of claim 1, wherein the relative information further comprises an identifier of the terminal or an identifier of the currently used.

3. The method of claim 2, wherein the step (b) comprises:
    checking the relative information, if the FDMA system uses a localized frequency allocation scheme; and
    adding the number of channels in the state information to a maximum channel identifier in use by the terminal, if the state information indicates an increase by the number of channels and the direction information indicates a positive direction.

4. The method of claim 2, wherein the step (b) comprises:
    checking the relative information, if the FDMA system uses a localized frequency allocation scheme; and subtracting the number of channels in the state information from a minimum channel identifier in use by the terminal, if the state information indicates an increase by the number of channels and the direction information indicates negative direction.

5. The method of claim 2, wherein the step (b) comprises:
checking the relative information, if the FDMA system uses a localized frequency allocation scheme; and
subtracting the number of the channels in the state information from a maximum channel identifier in use by the terminal, if the state information indicates a decrease by the number of channels and the direction information indicates a positive direction.

6. The method of claim 2, wherein the step (b) comprises:
checking the relative information, if the FDMA system uses a localized frequency allocation scheme; and
adding the number of channels in the state information to a minimum channel identifier, if the state information indicates a decrease by the number of channels and the direction information indicates a negative direction.

7. The method of claim 1, further comprising:
discarding frequency resources of the currently used channel, if the scheduling message is an Absolute Grant (AG) message including new frequency resource information; and
transmitting data using the new frequency resource information.

8. An apparatus for identifying frequency resources allocation in a terminal of a Frequency Division Multiple Access (FDMA) system, the apparatus comprising:
a receiver for receiving, from a base station, a scheduling message including frequency resource information;
a data transmission controller for determining channels allocated to the terminal based on relative information, if the scheduling message is a Relative Grant (RG) message including the relative information generated based on currently used channel; and
a data channel transmitter for transmitting data using the determined channels,
wherein the relative information includes state information indicating a number of channels to increase or decrease an amount of the frequency resources based on the currently used channel, and direction information indicating a direction to increase or decrease the amount of the frequency resources based on the currently used channel.

9. The apparatus of claim 8, wherein the receiver comprises:
an Absolute Grant (AG) receiver for receiving an AG message including new frequency resource information; and
an RG receiver for receiving the RG message including the relative information.

10. The apparatus of claim 8, wherein the relative information further comprises an identifier of the terminal or an identifier of currently used channel.

11. The apparatus of claim 10, wherein the data transmission controller:
checks the relative information, if the FDMA system uses a localized frequency allocation scheme; and
adds the number of channels in the state information to a maximum channel identifier in use by the terminal, if the state information indicates an increase by the number of channels and the direction information indicates a positive direction.

12. The apparatus of claim 10, wherein the data transmission controller:
checks the relative information, if the FDMA system uses a localized frequency allocation scheme; and
subtracts the number of channels in the state information from a minimum channel identifier in use by the terminal, if the state information indicates an increase by the number of channels and the direction information indicates a negative direction.

13. The apparatus of claim 10, wherein the data transmission controller:
checks the relative information, if the FDMA system uses a localized frequency allocation scheme; and
subtracts the number of channels in the state information from a maximum channel identifier in use by the terminal, if the state information indicates a decrease by the number of channels and the direction information indicates a positive direction.

14. The apparatus of claim 10, wherein the data transmission controller:
checks the relative information, if the FDMA system uses a localized frequency allocation scheme; and
adds the number of channels in the state information to a minimum channel identifier, if the state information indicates a decrease by the number of channels and the direction information indicates a negative direction.

15. The apparatus of claim 8, wherein the data transmission controller:
discards frequency resources of the currently used channel, if the scheduling message is an AG message including new frequency resource information; and
transmits data using the new frequency resource information.

16. A method for allocating frequency resources in a base station of a Frequency Division Multiple Access (FDMA) system, the method comprising:
generating a Relative Grant (RG) message including relative information generated based on a currently used channel, if there is a change in a number of channels allocated to a terminal; and
transmitting the generated RG message to the terminal,
wherein the relative information includes state information indicating a number of channels to increase or decrease an amount of the frequency resources based on the currently used channel, and direction information indicating a direction to increase or decrease the amount of the frequency resources based on the currently used channel.

17. The method of claim 16, wherein the relative information further comprises an identifier of the terminal or an identifier of the currently used channel.

18. An apparatus for allocating frequency resources in a base station of a Frequency Division Multiple Access (FDMA) system, the apparatus comprising:
a controller for generating a Relative Grant (RG) message including relative information generated based on a currently used channel, if there is a change in a number of channels allocated to a terminal; and
a transmitter for transmitting the generated RG message to the terminal,
wherein the relative information includes state information indicating a number of channels to increase or decrease an amount of the frequency resources based on the currently used channel, and direction information indicating a direction to increase or decrease the amount of the frequency resources based on the currently used channel.

19. The apparatus of claim 18, wherein the relative information further comprises an identifier of the terminal or an identifier of the currently used channel.

* * * * *